United States Patent [19]
Batey et al.

[11] 4,248,836
[45] Feb. 3, 1981

[54] RECOVERY OF NUCLEAR FUEL MATERIAL

[75] Inventors: William Batey; Alfred L. Mills, both of Thurso, Scotland; John A. Williams, Warrington, England

[73] Assignee: United Kingdom Atomic Energy Authority, London, England

[21] Appl. No.: 902,719

[22] Filed: May 4, 1978

[30] Foreign Application Priority Data

May 11, 1977 [GB] United Kingdom ............... 19861/77

[51] Int. Cl.$^3$ ............................................ G21C 19/48
[52] U.S. Cl. ......................................... 423/4; 148/15; 148/15.5; 148/16; 148/16.5; 148/19; 148/20; 225/2; 241/14; 241/30
[58] Field of Search ..................... 423/4; 148/15, 15.5, 148/16, 16.5, 19, 20; 241/30, 14; 225/2

[56] References Cited

U.S. PATENT DOCUMENTS

| | | |
|---|---|---|
| 3,089,751 | 5/1963 | Beaver et al. ............................ 423/4 |
| 3,867,510 | 2/1975 | Miller et al. ............................ 423/4 X |
| 4,045,356 | 8/1977 | Eisner et al. ............................ 225/2 |

FOREIGN PATENT DOCUMENTS 2820061  12/1978  Fed. Rep. of Germany .............. 423/4

OTHER PUBLICATIONS

Reactor Handbook, vol. II, Fuel Reprocessing, Interscience, N.Y. 1961, pp. 42–46; 50–55.

*Primary Examiner*—Richard E. Schafer
*Attorney, Agent, or Firm*—Larson, Taylor and Hinds

[57] ABSTRACT

Irradiated nuclear fuel is separated from the protective metal sheath in which it is enclosed by treating the sheath with an embrittling agent which effects embrittlement of the sheath, breaking up the sheath and separating the nuclear fuel material from the embrittled and broken-up sheath.

3 Claims, No Drawings

RECOVERY OF NUCLEAR FUEL MATERIAL

BACKGROUND OF THE INVENTION

This invention relates to the recovery of nuclear fuel material from irradiated nuclear fuel elements in which the nuclear fuel is contained in a protective metal sheath and in particular it relates to the recovery of nuclear fuel material from nuclear fuel elements in which the protective metal sheath is manufactured from austenitic stainless steel or austenitic nickel alloy.

Prior to the processing of irradiated nuclear fuel to separate fission products from the nuclear fuel material it is preferable to separate the nuclear fuel material from its protective sheath. It is present practice to shear fuel elements into short lengths mechanically and to dissolve out the fuel material preferentially. However the maintenance of a mechanical shear in a situation where it is exposed to radioactive conditions is difficult and the shearing operation gives rise to dust which contaminates the immediate area around the shear and has to be controlled. After the nuclear fuel material has been dissolved the resulting solution is further processed to separate the fission products from the reusable nuclear fuel material (uranium and plutonium) which is recovered and may be used to manufacture further fuel elements for use in a nuclear reactor. The separation processes are well known in the art and include solvent extraction processes using tributyl phosphate as the extracting agent.

SUMMARY OF THE INVENTION

According to the present invention a process for the recovery of nuclear fuel material from irradiated nuclear fuel elements in which the nuclear fuel material is contained within a protective metal sheath of austenitic stainless steel or austenitic nickel alloy includes the steps of contacting the sheath with an embrittling agent which reacts with the metal of the sheath to effect its embrittlement and then breaking up the sheath.

Suitable embrittling agents include the elements in Group VIb of the Periodic Table for example tellurium, the elements in Group IIb for example zinc and the elements in Group IVb particularly carbon in the form of a gaseous mixture of carbon dioxide and carbon monoxide.

DESCRIPTION OF THE PREFERRED EMBODIMENTS

The process of the invention will be illustrated by the following Examples, given by way of example only, of the initial stages in the recovery of nuclear fuel material from irradiated nuclear fuel elements in which the fuel elements are stainless steel pins containing the nuclear fuel material and in which a bundle of such pins are located inside a stainless steel wrapper to form a nuclear fuel sub-assembly in which the pins are positioned by means of spacer grids. A suitable stainless steel for the pins is an austenitic type 316 stainless steel which typically would have a composition in which the following components were present Cr 16–18%, Ni 10–14%, Mo 2–3%, C 0.04–0.06%, Mn 1.5–2% up to 0.75% Si with the balance being Fe and incidental impurities resulting from the process of steel manufacture.

EXAMPLE 1

An irradiated sub-assembly from a nuclear reactor in which sub-assembly the nuclear fuel material is contained in pins manufactured from a type 316 austenitic stainless steel is first stored for a cooling period which permits the decay of short lived fission products and then the wrapper of the sub-assembly is removed and the fuel pins and their associated grids are placed in a container, which may be made of glazed graphite. Tellurium is placed in the container and the container is sealed. An inert atmosphere, for example of argon is maintained in the container. The heat given out by the irradiated fuel raises the temperature in the container thus promoting embrittlement. If fuel pins are kept at 800° C. for 18 hours in an atmosphere containing tellurium they become brittle and may easily be broken up mechanically. The fuel pins and any associated grids may be broken up after embrittlement by removing the fuel pins and grids from the container and passing them through rollers or under a hammer to break up the embrittled stainless steel. The fragmented fuel pins and grids then pass to a magnetic separator where the embrittled steel is separated from the nuclear fuel material. The nuclear fuel material is then dissolved and the resulting solution is processed to separate the re-usable nuclear fuel material from the fission products by well known methods, for example, solvent extraction methods.

EXAMPLE 2

An irradiated nuclear fuel sub-assembly from which the wrapper has been removed is lowered into a cast-iron container holding molten zinc. In the container the pins and grids are plated with zinc metal. The plated sub-assembly is then removed from the molten zinc and transferred to a furnace where it is stored at a temperature of 750° C. in an inert atmosphere when embrittlement of the stainless steel occurs. The embrittled steel is then broken up mechanically and separated from the nuclear fuel material magnetically. The nuclear fuel material is then dissolved in acid solution and the resulting solution processed to separate the reusable nuclear fuel material from the fission products.

EXAMPLE 3

A nuclear fuel sub-assembly from which the wrapper has been removed is placed in a nickel-alloy container to which a mixture of carbon dioxide and carbon monoxide is admitted. The temperature within the container rises and carburisation of the stainless steel pins and grids occurs which effect embrittlement of the stainless steel which can be broken up mechanically and separated from the nuclear fuel material.

In the above Examples the protective metal sheath was a type 316 austenitic stainless steel.

The process of the present invention is also applicable in the recovery of nuclear fuel material from irradiated nuclear fuel elements in which the nuclear fuel material is contained in a sheath manufactured from Nimonic (Trade Mark) alloys such as Nimonic PE16 which is an austenitic nickel alloy which has the following composition: Ni 42–45%, Cr 15–18%, Mo 2.5–4%, Ti 1.1–1.5%, Al 1.1–1.5%, C 0.05–0.1%, B 0.005–0.01% with the balance being iron and incidental impurities.

We claim:

1. A process for the recovery of nuclear fuel material from irradiated nuclear fuel elements in which the nuclear fuel material is contained within a protective metal sheath, the metal of the sheath being selected from the group consisting of austenitic stainless steel and austenitic nickel alloy said process including the steps of immersing the protective sheath in molten zinc to plate the protective sheath with zinc metal, removing the plated protective sheath from the molten zinc, heating the plated sheath in an inert atmosphere to effect embrittlement of the sheath and then breaking up the embrittled sheath.

2. A process for the recovery of nuclear fuel material from irradiated nuclear fuel elements in which the nuclear fuel material is contained within a protective metal sheath, the metal of the sheath being selected from the group consisting of austenitic stainless steel and austenitic nickel alloy, said process comprising the steps of contacting the sheath with an embrittling agent which reacts with the metal of the sheath to effect its embrittlement and which is selected from the group consisting of tellurium, zinc, and a mixture of carbon dioxide and carbon monoxide; confining the sheath in contact with the embrittling agent and in an inert atmosphere at an elevated temperature until embrittlement of the sheath metal occurs; and breaking up the embrittled sheath.

3. A method according to claim 2 wherein said embrittling agent comprises tellurium.

* * * * *